United States Patent [19]

Kato

[11] Patent Number: 4,780,954

[45] Date of Patent: Nov. 1, 1988

[54] FUEL CELL ELECTROLYTE MATRIX AND A METHOD FOR MANUFACTURING THE SAME

[75] Inventor: Hiroshi Kato, Wake, Japan

[73] Assignee: Japan Gore-Tex, Inc., Tokyo, Japan

[21] Appl. No.: 86,828

[22] Filed: Aug. 19, 1987

[30] Foreign Application Priority Data

Aug. 19, 1986 [JP] Japan .................. 61-192118

[51] Int. Cl.$^4$ .................. H07M 6/00; H07M 4/86
[52] U.S. Cl. .................. 29/623.5; 424/41; 424/46
[58] Field of Search .................. 429/41, 46; 423/311, 423/314, 315; 29/623.5

[56] References Cited

U.S. PATENT DOCUMENTS

| | | | |
|---|---|---|---|
| 3,575,718 | 4/1971 | Adlhart et al. | 429/46 |
| 4,529,671 | 7/1985 | Kahara et al. | 429/46 X |
| 4,623,415 | 11/1986 | Kahara et al. | 429/46 X |

FOREIGN PATENT DOCUMENTS 53-4823 1/1978 Japan .................. 29/623.5

*Primary Examiner*—Brian E. Hearn
*Assistant Examiner*—Stephen J. Kalafut
*Attorney, Agent, or Firm*—Mortenson & Uebler

[57] ABSTRACT

As was described above, the present invention makes it possible to achieve a sufficient diminution of the effect of the water-repellent characteristics of polytetrafluoroethylene used as a binding agent. Accordingly, the mixture ratio of polytetrafluoroethylene can be increased so that a sufficient film strength is obtained. Furthermore, a high foam pressure is obtained by forming a fine fibrilized net of polytetrafluoroethylene. Moreover, since the amount of polytetrafluoroethylene used is thus large, the molding characteristics of the product are favorable, and the yield can be increased. Accordingly, a highly reliable product can be obtained at a high yield. As a result, the present invention has the effect of improving the performance and reliability of the fuel cell as a whole, and of increasing the useful life and reducing the cost of the fuel cell. Accordingly, the present invention has great industrial merit.

3 Claims, No Drawings

FUEL CELL ELECTROLYTE MATRIX AND A METHOD FOR MANUFACTURING THE SAME

DETAILED DESCRIPTION OF THE INVENTION

1. Object of the Invention

The object of the present invention is to provide a product which has all of the characteristics required in a fuel cell electrolyte matrix.

2. Field of Industrial Utilization

The present invention concerns an electrolyte-retaining matrix for use in fuel cells which use phosphoric acid as an electrolyte.

3. Prior Art

In the past, phosphoric-acid-resistant inorganic powders such as powdered SiC, Sic whiskers or $Ta_2O_5$, etc., have generally been used as matrices for fuel cells which use phosphoric acid as an electrolyte. Such matrices are manufactured by the following methods:

(A) A mixture formed by mixing the aforementioned inorganic powder with a small amount of polytetrafluoroethylene (as a binding agent) and adding an appropriate amount of solvent is formed into a thin film on the electrodes by blowing or painting, etc.; the solvent is then removed by heating or drying, etc., and the film is impregnated with phosphoric acid.

(B) A thin film is formed directly on the electrodes in the same manner as in (A), using phosphoric acid as a solvent.

(C) A thin film layer is formed on the electrodes without using a macromolecular binding agent such as polytetrafluoroethylene, etc., by using a metal phosphate such as zirconium phosphate, etc., as a binding agent.

4. Problems Which the Present Invention Attempts to Solve

The characteristics required in a fuel cell electrolyte matrix of the type described above include the following characteristics (1) through (5):

(1) The matrix must be stable against hot, concentrated phosphoric acid, which is one of the operating conditions of such a fuel cell.

(2) The matrix must be an electronic insulator, and must have a sufficiently high ionic conductivity.

(3) The matrix must have the ability to block gas permeation at the time of impregnation with phosphoric acid, i.e., must have a high foam pressure.

(4) The matrix must have a high affinity for phosphoric acid, so that the osmotic diffusion of phosphoric acid is rapid.

(5) The matrix must have sufficient mechanical strength to allow the formation of a thin film.

In the case of matrices manufactured by the aforementioned methods (A) and (B), however, even though the abovementioned requirement (1) may be satisfied, the strong water-repelling nature of polytetrafluoroethylene causes a deterioration in the affinity of the matrix for phosphoric acid (4) if the amount of polytetrafluoroethylene used is increased in order to improve the mechanical strength (5). As a result, the foam pressure and permeation rate are also suppressed and the ionic conductivity (2) is also inferior. On the other hand, matrices which have a small polytetrafluoroethylene content lack mechanical strength and stability (5), so that the film thickness cannot be made very thin. As a result, there are limits to the extent to which the resistance of the matrix can be lowered, and the useful life of the fuel cell is insufficient and unstable. Thus, in the final analysis, matrices manufactured by methods (A) and (B) are generally limited in terms of matrix resistance, ionic conductivity, foam pressure and useful life of the fuel cell.

Furthermore, in the case of matrices manufactured by method (C), even though the problems created by the water-repelling characteristics of polytetrafluoroethylene may be eliminated, the binding characteristics are essentially inferior; as a result, such matrices lack mechanical strength (5). Thus, the disadvantages of the abovementioned matrices with a small polytetrafluoroethylene content are magnified.

CONSTITUTION OF THE INVENTION

MEANS USED TO SOLVE THE ABOVEMENTIONED PROBLEMS (1) A fuel cell electrolyte matrix which is characterized by the fact that said matrix consists of 4 to 66 wt % powdered metal phosphate, 12 to 85 wt % phosphoric-acid-resistant inorganic powder, and 6 to 66 wt % polytetrafluoroethylene.

(2) A method for manufacturing a fuel cell electrolyte matrix, which is characterized by the fact that (a) 6 to 60 parts by weight of polytetrafluoroethylene is mixed with 40 to 94 parts by weight of a mixed powder consisting of (i) 10 to 70 wt % inorganic powder capable of forming a metal phosphate and (ii) 30 to 90 wt % phosphoric-acid-resistant inorganic powder, (b) said mixture is formed into a sheet, (c) the porous structure of said sheet is impregnated with phosphoric acid, and (d) the sheet is then heat-treated so that the aforementioned inorganic powder capable of forming a metal phosphate is converted into a metal phosphate.

EFFECT OF THE INVENTION

The hydrophilic characteristics of the matrix are improved by including 4 wt % or more powdered metal phosphate in the matrix. By setting the upper limit of this metal phosphate content at 66 wt %, appropriate contents of a phosphoric-acid-resistant inorganic powder and polytetrafluoroethylene are made possible, so that an appropriate mixture ratio is maintained with respect to the three constituents. Thus, an effect of the phosphoric-acid-resistant inorganic powder in stabilizing the physical properties of the film, and an effect of said powder in retaining phosphoric acid for the reaction, are insured. Furthermore, since at least 6 wt % (or more ) polytetrafluoroethylene can be included, mechanical strength of the film is insured.

The content of the aforementioned phosphoric-acid-resistant inorganic powder is set at 12 wt % or more, so that the aforementioned powdered metal phosphate is appropriately fixed in the film. Furthermore, by setting the upper limit of this content at 85 wt %, the mixture balance with the other raw materials is maintained, so that the desired product quality can be obtained.

The film strength is maintained as described above by setting the polytetrafluoroethylene content at 6 wt % or greater. Furthermore, by setting the upper limit of this content at 60 wt %, the mixture balance is maintained, so that the required affinity for phosphoric acid is obtained by controlling the water-repelling characteristics of the polytetrafluoroethylene.

As was mentioned above, a film is formed in which 6 parts by weight or more of polytetrafluoroethylene is mixed with 40 to 94 parts by weight of a mixed powder which consists of (i) an inorganic powder which is capable of forming a metal phosphate, and (ii) a phosphoric-acid-resistant inorganic powder, and said film is then heat-treated so that the aforementioned powder (i) is converted into a metal phosphate. As a result, the hydrophilicity of the product film is appropriately increased, and the electronic conductivity of the product (which arises from the electronic conductivity of SiC in cases where SiC alone is used in large amounts as a phosphoric-acid-resistant inorganic powder) is appropriately decreased.

PRACTICAL EXAMPLES OF APPLICATION OF THE INVENTION

The following is a further description of the present invention:

The matrix of the present invention is composed of three constituents: i.e., a powdered metal phosphate, a phosphoric-acid-resistant inorganic powder, and polytetrafluoroethylene. Of course, small amounts of other auxiliaries or additives may be mixed with this basic composition.

By including 4% or more powdered metal phosphate (in terms of wt %; hereafter referred to simply as "%") in the matrix, the hydrophilicity required in a matrix used in fuel cells which use phosphoric acid as an electrolyte is obtained. Furthermore, by setting the content of the aforementioned phosphoric-acid-resistant inorganic powder at 12% or more, the appropriate fixing of the aforementioned powdered metal phosphate in the matrix is insured. Furthermore, the necessary strength is maintained in the matrix film by setting the polytetrafluoroethylene content at 6% or more. By setting the upper limit of the powdered metal phosphate content at 66%, the upper limit of the phosphoric-acid-resistant inorganic powder at 85%, and the upper limit of the polytetrafluoroethylene content at 66%, an appropriate mixture balance is obtained among these constituents.

In the matrix of the present invention, it is of course possible to use a powdered metal phosphate as described above. In terms of the concrete manufacturing process, however, it is desirable to use an inorganic powder which is capable of forming a powdered metal phosphate, instead of an actual powdered metal phosphate itself. The desired product is then obtained as follows: i.e., the abovementioned inorganic powder is mixed with a phosphoric-acid-resistant powder. Next, an amount of polytetrafluoroethylene sufficient to insure the desired mechanical strength is mixed with this mixed powder. The resulting mixture is kneaded by ordinary methods, and is formed into a film by means of a forming method such as rolling or extrusion, etc. Afterward, the spaces in the resulting film are filled with phosphoric acid, and the film is heated in this state to a temperature of 100° to 370° C. (preferably 200° to 350° C.), so that the aforementioned inorganic powder capable of forming a metal phosphate is converted into a metal phosphate.

The aforementioned polytetrafluoroethylene may be used in a general plastic state, or may in some cases be mixed in a fine granular or scrap state, etc. In some cases, furthermore, the polytetrafluoroethylene may be rolled or drawn beforehand so that a porous film is formed. In such cases, the porous film is formed from polytetrafluoroethylene which contains a phosphoric-acid-resistant inorganic powder of the type described above. The spaces of such a porous polytetrafluoroethylene film containing a phosphoric-acid-resistant inorganic powder are impregnated with a liquid or solution-form compound which is capable of being converted into a metal phosphate. Afterward, this compound is converted into a metal phosphate or an inorganic compound capable of forming a metal phosphate, said conversion being accomplished by a chemical reaction or pyrolysis, etc., so that the film is filled with this metal phosphate or compound capable of forming a metal phosphate. Next, the film is impregnated with phosphoric acid and heat-treated as described above.

In such cases, the amount of the aforementioned polytetrafluoroethylene that is mixed in the composition is 6 to 60 wt % (preferably 13 to 40 wt %), and the remaining 40 to 94 wt % (preferably 60 to 87 wt %) of the composition consists of the aforementioned phosphoric-acid-resistant powder and the aforementioned inorganic powder capable of being converted into a metal phosphate. Here, it is desirable that the content of the inorganic powder capable of being converted into a metal phosphate be 10 wt % or greater, and that the content of the phosphoric-acid-resistant powder be 30 wt % or greater.

A zirconium compound, titanium compound or aluminum compound, etc., may be used for the aforementioned inorganic powder capable of being converted into a metal phosphate; however, zirconium oxide is of optimal desirability. Furthermore, alkoxides or oxychlorides of the aforementioned zirconium, titanium or aluminum may be used as liquid or solution-form compounds which are capable of being converted into a phosphate. Furthermore, SiC, $Ta_2O_5$ or a carbonaceous powder, etc., may be used for the aforementioned phosphoric-acid-resistant inorganic powder; in this case, SiC is most desirable.

It is desirable that the abovementioned inorganic powders be prepared as fine powders with a particle size of 10 microns or less. It is appropriate to use a mixed powder which contains the aforementioned phosphoric-acid-resistant inorganic powder. In this case, the phosphoric-acid-resistant inorganic powder itself has an affinity for phosphoric acid, and naturally contributes to the overall affinity for phosphoric acid; however, this powder also serves to prevent the deposition (on the film surface) of the aforementioned inorganic powder capable of forming a metal phosphate when the latter powder is converted into a metal phosphate. Specifically, the aforementioned inorganic powder capable of forming a metal phosphate reacts with phosphoric acid so that it is temporarily converted into a solute state. At this time, the aforementioned phosphoric-acid-resistant powder prevents this solute substance from being pushed out onto the surface of the film as a result of the water-repelling characteristics of the polytetrafluoroethylene. Furthermore, this phosphoric-acid-resistant inorganic powder also serves to stabilize the film structure, and the pore size and void ratio, etc., can also be controlled by means of this phosphoric-acid-resistant inorganic powder. Specifically, by using an inorganic powder with a small particle size, the pore size can be decreased so that a film with a high foam pressure is obtained. Conversely, by using particles with a somewhat increased particle size, it is possible to obtain a film with a large pore size and a large void ratio, and consequently a high permeation rate. Accordingly, by laminating (or otherwise forming into an integral unit) films of these two types, it is possible to form a film which has both a high permeation rate and a high foam pressure.

In the present invention, the conversion of the aforementioned inorganic powder capable of forming a metal phosphate into such a metal phosphate causes an increase in the hydrophilicity of the film; however, the details of the mechanism of this action are not completely clear. It is thought that this effect is attributable to the following process; i.e., when certain minimum amounts of polytetrafluoroethylene and inorganic powder are mixed and kneaded, etc., and the polytetrafluoroethylene is fibrilized in order to increase the mechanical strength, the polytetrafluoroethylene fibrils wind around the inorganic powder particles, so that the hydrophilicity of the organic powder is blocked, resulting in a weak overall hydrophilicity. However, when the abovementioned inorganic powder is converted into a metal phosphate as described above in the present invention, the inorganic powder around which the polytetrafluoroethylene fibrils are wound dissolves and is re-deposited so that is is loosened from the fibrils, thus resulting overall in a structure in which the inorganic powder is caught in a fibril net. As a result, the effective exposed surface area of the inorganic powder is increased. An appropriate hydrophilicity is obtained by a similar effect in cases where a liquid or solution-form precursor compound which is capable of forming a metal phosphate is used. In this case, the heat treatment using phosphoric acid acts to convert the precursor compound into a compound which is stable with respect to phosphoric acid.

Furthermore, the present invention is characterized by the fact that phosphoric acid and the aforementioned inorganic powder capable of forming a metal phosphate are caused to react in a state in which the spaces inside the film are filled with phosphoric acid. This is done in order to prevent the inorganic substance dissolved in the phosphoric acid from being eluted from the film as described above. For example, this process cannot be accomplished by a method involving immersion of the film in liquid phosphoric acid followed by heating. Specifically, this process is accomplished as follows: i.e., the film containing the aforementioned inorganic powder capable of forming a metal phosphate is impregnated with alcohol, etc., after which the film is filled with phosphoric acid by substitution in the order water→phosphoric acid, or else the film is directly impregnated with phosphoric acid, after which the film is sandwiched between sheets of carbon paper, etc., which has been subjected to a water-repulsion treatment by means of a dispersion of polytetrafluoroethylene, etc., and the excess [sic] is retained in the spaces of the carbon paper. In this state, the film is heated to a prescribed temperature. In this case, the moisture created by the dehydration reaction of the phosphoric acid and the inorganic substance diffuses via the pores of the carbon paper, and thus prevents the phosphoric acid from becoming insufficient due to volatilization, etc., and prevents the film from drying out; accordingly, the phosphoric acid in the film is replenished supplemented by the phosphoric acid in the carbon paper.

Concrete examples of manufacture of the matrix of the present invention are described below.

EXAMPLE OF MANUFACTURE 1

A mixed powder consisting of 50% powdered $\alpha$-SiC (particle size: 3 microns), 35% finely powdered $ZrO_2$ and 15% polytetrafluoroethylene was obtained by the co-coagulation [sic] method. 40 parts by weight of a liquid lubricant was added to 100 parts by weight of this mixed powder, and the resulting mixture was formed into a sheet with a thickness of 0.1 mm by paste extrusion and rolling. The liquid lubricant was then vaporized and removed by heating this sheet to 300° C.

Next, the abovementioned sheet was immersed for 24 hours in isopropyl alcohol, then for 24 hours in water, and finally for 24 hours in ortho-phosphoric acid, so that the spaces in said sheet were impregnated with orthophosphoric acid, and so that ortho-phosphoric acid was caused to adhere to the surfaces of said sheet. Next, this sheet was sandwiched between sheets of carbon paper which had been subjected to a water-repulsion treatment by means of polytetrafluoroethylene. With the entire area of the sheet placed under a light pressure, the sheet was gradually heated to 350° C. The sheet was maintained at this temperature for eight hours, and was then cooled to room temperature. The sheet was then washed with water and dried to produce a matrix sheet with a thickness of 0.12 mm.

EXAMPLE OF MANUFACTURE 2

A matrix sheet with a thickness of 0.12 mm was produced exactly as in Example of Manufacture 1, except that the mixture used consisted of 34% powdered $\alpha$-SiC (particle size: 0.6 microns), 46% finely powdered $ZrO_2$ and 20% polytetrafluoroethylene.

EXAMPLE OF MANUFACTURE 3

The respective materials obtained after paste extrusion in Examples of Manufacture 1 and 2 were laminated and rolled to produce a two-layer laminated sheet with a thickness of 0.13 mm. Afterward, a matrix sheet with a thickness of 0.15 mm was obtained by the same process used above.

EXAMPLE OF MANUFACTURE 4

A powder consisting of 85% powdered $\beta$-SiC (particle size: 0.37 microns) and 15% polytetrafluoroethylene was obtained by the co-coagulation [sic] method. 37 parts by weight of a liquid lubricant was mixed with 100 parts by weight of this mixed powder, and the resulting mixture was paste-extruded and rolled to produce a sheet with a thickness of 0.1 mm. The liquid lubricant was then removed by heating.

The abovementioned sheet was immersed in a tetrabutyl zirconate solution so that the film was impregnated with tetrabutyl zirconate. Next, hydrolysis was effected by immersing the film in water at 80° C., so that the tetrabutyl zirconate was converted into hydrated zirconium oxide. Thus, a film packed with zirconium oxide was obtained.

The film obtained as described above was immersed for 24 hours in orthophosphoric acid, so that said film was impregnated with phosphoric acid. Afterward, the film was removed, sandwiched between sheets of carbon paper which had been subjected to a water-repulsion treatment, and heated for 8 hours at 350° C. to produce a matrix sheet.

COMPARATIVE EXAMPLE 1

A matrix sheet obtained by removing the liquid lubricant following paste extrusion and rolling in Example of Manufacture 4 was produced as a comparative example.

COMPARATIVE EXAMPLE 2

A matrix sheet was produced as in Example of Manufacture 1, except that the mixture used consisted of 56% $\alpha$-SiC, 39% finely powdered $ZrO_2$ and 5% polytetrafluoroethylene. When the liquid lubricant was removed following paste extrusion and rolling, slight cracking occurred in the film.

The foam pressure, phosphoric acid permeation rate and strength were measured for the respective matrix sheets produced in the abovementioned examples of manufacture and comparative examples. The results obtained are shown in the following table:

|     | a (kg/cm²) | b (mm/hour) | c (kg/mm) |
| --- | --- | --- | --- |
| d 1 | 2.5 | 32 | 0.71 |
| d 2 | 0.5 | 55 | 0.50 |
| d 3 | 1.0 | 43 | 0.59 |
| d 4 | 1.3 | 30 | 0.63 |
| e 1 | 0.1 | 5 | 0.51 |
| e 2 | 0.05 | 44 | 0.03 |

Key:
a Foam pressure (kg/cm²),
b Phosphoric acid permeation rate (mm/hr),
c Strength (kg/mm),
d Example of Manufacture,
e Comparative Example.

I claim:

1. A method for manufacturing a fuel cell electrolyte matrix which comprises (a) mixing 6 to 60 parts by weight of polytetrafluoroethylene powder with 40 to 94 parts by weight of a mixed powder comprising (i) 10 to 70 weight percent inorganic powder capable of forming a metal phosphate and (ii) 30 to 90 weight percent phosphoric-acid-resistant inorganic powder to produce a mixture, (b) forming said mixture into a porous sheet, (c) impregnating the porous structure of said sheet with phosphoric acid, and (d) heating the sheet so that the aforementioned inorganic powder capable of forming a metal phosphate is converted in situ into a metal phosphate.

2. The method of claim 1 in which said mixture is obtained by co-coagulation.

3. A method for manufacturing a fuel cell electrolyte matrix comprising (a) impregnating a porous film comprising 6 to 60 parts by weight of polytetrafluoroethylene, 10 to 70 weight percent inorganic powder capable of forming a metal phosphate and 30 to 90 weight percent phosphoric-acid-resistant inorganic powder with phosphoric acid, and (b) heating said film so that the aforementioned inorganic powder capable of forming a metal phosphate is converted in situ into a metal phosphate.

* * * * *